United States Patent Office 3,405,172
Patented Oct. 8, 1968

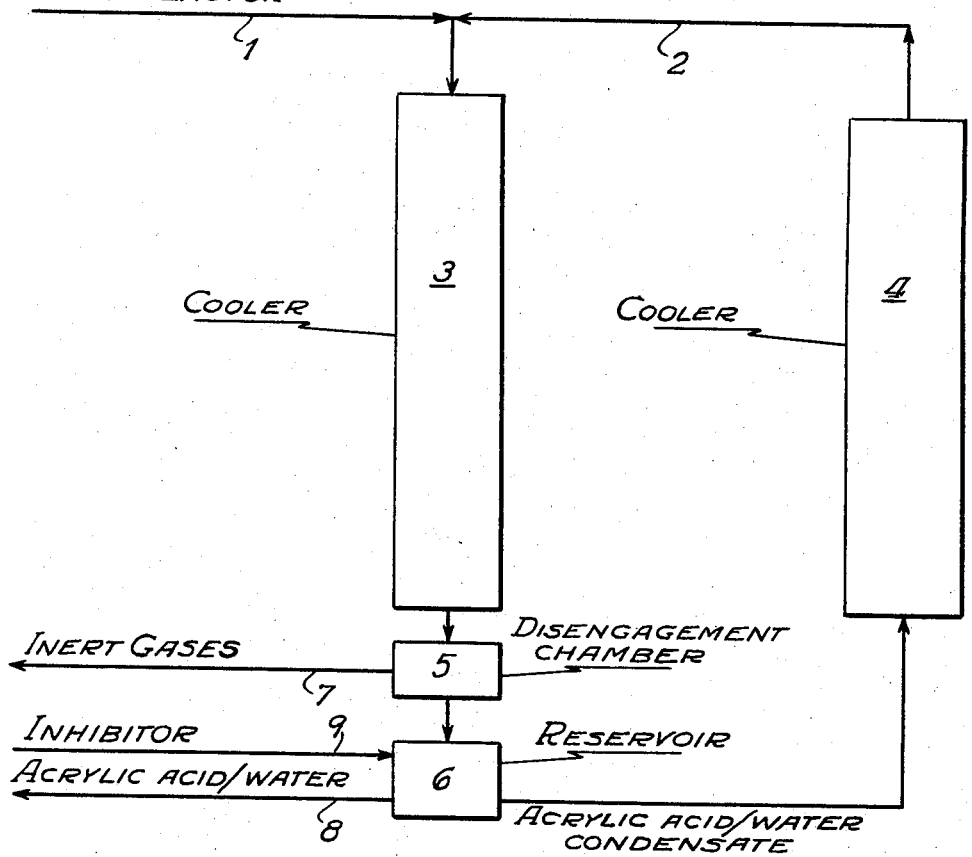

3,405,172
PREPARATION OF ACRYLIC ACID WITH THE PREVENTION OF FORMATION OF ACRYLIC POLYMERS
Christopher John Brown, Tadworth, and Alfred Frank Millidge, Coulsdon, England, assignors to The Distillers Company Limited, Edinburgh, Scotland, a British company
Continuation-in-part of application Ser. No. 245,896, Dec. 19, 1962. This application Sept. 26, 1966, Ser. No. 592,698
6 Claims. (Cl. 260—530)

ABSTRACT OF THE DISCLOSURE

A process for the production of acrylic acid and for prevention of the formation of acrylic acid polymers wherein the vapor effluent from a catalytic vapor phase oxidation of acrolein or propylene in the presence of oxygen is rapidly quenched with liquid acrylic acid or aqueous solutions thereof to a temperature of from 0° C. to below about 100° C.

---

This is a continuation-in-part of copending application Ser. No. 245,896, filed Dec. 19, 1962, now abandoned.

The present invention relates to the production of unsaturated aliphatic acids and more particularly to an improved method of production of acrylic acid.

It is known to produce acrylic acid by the vapor phase catalytic oxidation at elevated temperature of acrolein or a compound which gives rise to acrolein under the reaction conditions e.g. propylene or allyl alcohol, with molecular oxygen. The gas stream leaving the reactor contains, in addition to acrylic acid monomer, unreacted starting material (acrolein), nitrogen, carbon dioxide and residual oxygen. Owing to the tendency of acrylic acid monomer to undergo polymerization at temperatures, particularly in the region of 100° C. in the presence of oxygen, polymerization of some of the acrylic acid is found to take place in the cooling gas stream during passage from the reactor to the processing step for the recovery of the acrylic acid monomer. Such polymer formation necessitates the frequent cleaning of lines and of particular parts of the plant which otherwise would become blocked by deposits.

It is an aim of the present invention to provide a method of preparation of acrylic acid whereby the gases leaving the reactor are rapidly quenched, thus reducing the undesirable polymerization of the acrylic acid monomer.

According to the present invention a process for the production of acrylic acid comprises reacting at an elevated temperature in the vapor phase, acrolein or a compound which gives rise to acrolein under the reaction conditions, and molecular oxygen, in the presence of an oxidation catalyst, and quenching the gaseous reaction mixture containing acrylic acid monomer leaving the reactor to below 100° C. by contact with a cooled liquid comprising acrylic acid.

The oxidation catalyst may be a compound or compounds of polyvalent metals with molybdenum and oxygen. Such catalysts may be for example the molybdates of chromium, vanadium, iron, cerium, titanium, nickel, tungsten, bismuth, tin, antimony and cobalt singly or in admixture. It is preferred to use cobalt molybdate.

The ratio of polyvalent metal to molybdenum in the catalyst may vary within moderately wide limits, but it is preferred to use an atomic ratio not substantially greater than 1:1.

The proportion of acrolein or compound giving rise to acrolein e.g. propylene or allyl alcohol, in the feed may vary within wide limits for example between 1 and 20% by volume, and preferably between about 2 and 10% by volume.

The concentration of oxygen in the feed may also vary within moderately wide limits, for example between 1 and 20% by volume and preferably between 2 and 15% by volume. The oxygen may be diluted with inert gases, and may be, for example supplied as air.

It is preferred to carry out the reaction in the presence, as diluent, of a gas which is substantially inert under the conditions of reaction, for example nitrogen, propane, butane, isobutane, carbon dioxide, steam or mixtures thereof. It is preferred to use steam or nitrogen or mixtures thereof. The concentration of the steam may vary within wide limits, for instance between 20 and 60% by volume of the feed.

The reaction is carried out at an elevated temperature, preferably between 300 and 500° C.

The contact time may be, for example, in the range 1 to 30 seconds.

The reaction gases are preferably quenched immediately on exit from the reactor. Cooling takes the form of direct contact of the gases with a precooled liquid comprising acrylic acid and may be effected in any suitable manner, e.g. by counter- or co-current flow through a packed zone. The effect of the quench is to condense the reaction gases, the condensate being simultaneously absorbed in the quenching liquid, the liquid flowing from the quenching zone comprising a solution in the cooling liquid of the acrylic acid recently produced. The concentration of acrylic acid obtained in the condensate according to the process is sufficiently high to permit effective purification and concentration of the acrylic acid produced.

The cooling liquid is preferably an aqueous solution of acrylic acid of any suitable concentration e.g. 20% w./w., but may be substantially pure acrylic acid. The liquid may also contain any of the known polymerization inhibitors such as hydroquinone or methylene blue in order further to prevent polymerization of the acrylic acid monomer. Cooling of the liquid may be carried out by any suitable method such as known refrigeration techniques.

The degree of cooling produced by the quench depends on the initial temperature of the reaction gases and the precooled liquid. Usually the final temperature of the liquid phase containing the condensed absorbed acrylic acid ranges from just below 100° C. to about 0° C. Additional cooling may be obtained by indirect heat exchange using conventional apparatus.

The rapid cooling technique in accordance with the present invention is described in more detail with reference to the accompanying drawing which shows schematically in the form of a flow sheet the treatment of gases containing acrylic acid monomer after leaving the reactor.

The reactor products from the catalytic oxidation of acrolein in accordance with the process described above, after cooling to ca. 200° C., are fed through line 1 to a suitable cooler vessel 3 such as a packed column or a multitubular heat exchanger where the products are brought into contact with recycle condensate from line 2. This condensate, pumped from reservoir 6 through the cooler 4, is inhibited with an oxidation inhibitor. Condensation and absorption of acrylic acid and water from the reactor product stream occur and the resultant enriched acrylic acid solution flows to reservoir 6. The inert gases are separated from the condensate in the disengagement chamber 5 and vented through line 7. Inhibitor solution is added to the condensate through line 9 and the excess condensate over that required for recycle quenching purposes is removed through 8 to recovery of the acrylic acid.

The acrylic acid may be finally recovered by any suitable means e.g. esterification, salt formation or solvent extraction followed by fractional distillation.

The cooling technique in accordance with the present invention is further illustrated by the following examples.

Example I

A system was used similar to that described above with reference to the accompanying drawing. Oxidation reactor products containing acrylic acid monomer at ca. 200° C. entering through line 1 were quenched in cooler 3, a multitube heat exchanger, with 7 lit./hr. of cooled (4° C.) acrylic acid solution flowing through recycle line 2 to give a combined stream cooled to 40° C. In the embodiment described here, the liquid flowing in line 2 is passed into line 1 through a restriction (not shown) such that the gas stream flowing through line 1 into cooler 3 is sprayed at the junction of lines 1 and 2 with the cooled acrylic acid solution. The combined cooled stream was cooled further before separation of the inert gases in chamber 5 by indirect heat exchange means (not shown). The vent gas flow contained 1–3% residual oxygen. The condensate, containing the acrylic acid formed in the oxidation reactor, was removed continuously at a rate of 400–450 ml./hr. from reservoir 6. After 40 hours run the recycle and condensation system was completely free of any acrylic acid polymer and no interruption of the continuous process was necessary.

As a comparison, an experiment was carried out in which the exit gas stream was cooled in cooler 3 acting as a conventional condenser without recycle of condensate. Flow rates of reactor products were similar to those used in the above example. There was 400–450 ml./hr. of acrylic acid/water condensate and a gas flow to vent of 650 lit./hr. Polymer began to form in line 1 and in the upper section of cooler 3, and after only 25 hours complete blockage occurred around the inlet inside cooler 3.

Example II

In a system similar to that employed in Example I, the reactor products, consisting essentially of acrylic and acetic acids together with steam, oxygen and nitrogen at about 300° C. was quenched in cooler 3 with cooled (10° C.) inhibited condensate circulated at the rate of 15 lit./hr. from reservoir 6 through cooler 4 and line 2. The resulting stream (50° C.) was cooled in a multitubular condenser to 15° C. and the gases separated in a small cyclone acting as disengagement chamber 5. Condensate was removed from the system through reservoir 6 at the rate of about 30 ml./hr. During a 20 hr. run, the average polymer concentration in the product was 2.6% w./w. On examination, the acid condensing system was found to be completely clean and free of polymer.

In a similar run on the same equipment, without condensate recirculation, the average polymer concentration in the inhibited condensate was 3.4%, and the multitubular condenser became blocked with acrylic acid polymer after 9 hours operation.

What is claimed is:

1. A process for the preparation of acrylic acid by the vapor phase oxidation of acrolein with molecular oxygen in the presence of an oxidation catalyst to produce acrylic acid monomer and residual oxygen-containing reaction gases which comprises quenching said reaction gases by contacting the reaction gases with a cooled liquid selected from the group consisting of liquid acrylic acid and an aqueous solution of acrylic acid to cool said gases to a temperature in the range of from about 0° C. to below about 100° C. absorbing the acrylic acid monomer from the reaction gases in said liquid to form an acrylic acid-containing condensate, recycling at least a portion of said condensate to provide said liquid, and withdrawing the remainder of the acrylic acid-containing condensate.

2. A process as claimed in claim 1 wherein the cooled liquid comprises an aqueous solution of acrylic acid.

3. A process as claimed in claim 1 wherein the cooled liquid comprises substantially pure acrylic acid.

4. A process as claimed in claim 1 wherein the cooled liquid also contains a polymerization inhibitor selected from the group consisting of hydroquinone and methylene blue.

5. A process as claimed in claim 1 wherein the gaseous reaction mixture is quenched by direct contact of the gases immediately on exit from the reactor with the cooled liquid comprising acrylic acid.

6. A process as claimed in claim 1 wherein additional cooling of the gaseous reaction mixture is produced by an indirect heat exchange method.

References Cited

UNITED STATES PATENTS

| | | | |
|---|---|---|---|
| 3,002,017 | 9/1961 | Wearsch et al. | 260—526 |
| 3,065,264 | 11/1962 | Koch et al. | 260—533 |

LORRAINE A. WEINBERGER, *Primary Examiner.*

V. GARNER, *Assistant Examiner.*